(12) United States Patent
Cavalca et al.

(10) Patent No.: US 11,334,029 B2
(45) Date of Patent: May 17, 2022

(54) APPARATUS COMPRISING A GLASS OR A SCREEN

(71) Applicant: FGP CAPITAL SA, Geneva (CH)

(72) Inventors: Fabrizio Cavalca, Carouge (CH); Rene Grand, Genthod (CH); Philippe Froehlicher, Geneva (CH)

(73) Assignee: FGP CAPITAL SA

( * ) Notice: Subject to any disclaimer, the term of this patent is extended or adjusted under 35 U.S.C. 154(b) by 96 days.

(21) Appl. No.: 16/494,786

(22) PCT Filed: Feb. 14, 2018

(86) PCT No.: PCT/IB2018/050902
§ 371 (c)(1),
(2) Date: Sep. 17, 2019

(87) PCT Pub. No.: WO2018/167582
PCT Pub. Date: Sep. 20, 2018

(65) Prior Publication Data
US 2020/0391482 A1 Dec. 17, 2020

(30) Foreign Application Priority Data

Mar. 17, 2017 (CH) ..................................... 00328/17
Jul. 17, 2017 (CH) ..................................... 00929/17

(51) Int. Cl.
*B32B 3/10* (2006.01)
*G04B 39/00* (2006.01)
(Continued)

(52) U.S. Cl.
CPC ............... *G04B 39/00* (2013.01); *B32B 3/02* (2013.01); *B32B 3/30* (2013.01); *B32B 7/06* (2013.01);
(Continued)

(58) Field of Classification Search
None
See application file for complete search history.

(56) References Cited

U.S. PATENT DOCUMENTS 3,748,456 A * 7/1973 Brien ..................... G01D 11/28
362/23.15
4,257,115 A * 3/1981 Hatuse ................. G04G 9/0082
368/232
(Continued)

FOREIGN PATENT DOCUMENTS

| CN | 203966101 | 11/2014 |
|---|---|---|
| CN | 204894644 | 12/2015 |
| WO | WO 2011/112817 | 9/2011 |

*Primary Examiner* — Christopher M Polley
(74) *Attorney, Agent, or Firm* — Galbreath Law Offices, P.C.; John A. Galbreath

(57) ABSTRACT

The invention concerns an apparatus including a crystal or a screen in which the crystal or the screen is arranged to ensure sealing and an anti-scratch protection of said apparatus which is intended to display an information visible to a user through the crystal or the screen. The apparatus includes a first material layer (1) made of an unbreakable transparent plastic polymer fastened on the apparatus in a tight manner, and a second material layer (2) made of a transparent glass, superimposed on the first layer (1) and constituting the outer portion of the crystal or the screen of the apparatus. The second material layer (2) made of a transparent glass includes, carried by its inner face, a transparent repositionable glue film (4), this repositionable glue film (4) ensuring the repositionable adherence of the second material layer (2) on the first material layer (1), whereas the second material layer (2) with its repositionable glue film (4) can be removed so as to be able to be replaced by another second material layer (2) provided with a transparent repositionable glue film (4), without breaking the sealing of said (Continued)

apparatus ensured by the first material layer (1) which remains permanently fastened on said apparatus.

18 Claims, 4 Drawing Sheets

(51) Int. Cl.
  *G02B 1/14* (2015.01)
  *B32B 3/02* (2006.01)
  *B32B 3/30* (2006.01)
  *B32B 7/06* (2019.01)
  *B32B 7/12* (2006.01)
  *H04B 1/3888* (2015.01)

(52) U.S. Cl.
  CPC ............... *B32B 7/12* (2013.01); *G02B 1/14* (2015.01); *G04B 39/006* (2013.01); *B32B 2250/02* (2013.01); *B32B 2307/40* (2013.01); *B32B 2307/402* (2013.01); *B32B 2307/412* (2013.01); *B32B 2307/414* (2013.01); *B32B 2307/584* (2013.01); *B32B 2307/732* (2013.01); *B32B 2457/208* (2013.01); *H04B 1/3888* (2013.01)

(56) References Cited

U.S. PATENT DOCUMENTS

| | | | | |
|---|---|---|---|---|
| 4,603,065 A | * | 7/1986 | Mori | G09F 13/22 40/544 |
| 4,875,433 A | * | 10/1989 | Tsukamoto | G01D 11/28 116/335 |
| 5,266,427 A | * | 11/1993 | Iwase | G01P 1/08 428/195.1 |
| 5,966,344 A | * | 10/1999 | Umemoto | G04B 19/12 368/227 |
| 6,169,708 B1 | * | 1/2001 | Kaneko | G02F 1/13362 368/84 |
| 8,567,596 B1 | | 10/2013 | Mason | |
| 2015/0183201 A1 | | 7/2015 | Cohen | |

* cited by examiner

APPARATUS COMPRISING A GLASS OR A SCREEN

The present invention relates to an apparatus including a crystal or a screen and arranged to ensure sealing and an anti-scratch protection of the apparatus.

The degradation of the visual appearance of an apparatus including a crystal or a screen, for example a watch, when wearing is an essential quality perception factor for the consumer. The alterations of the surface of the items come from stresses of all kinds, in particular of mechanical origin. The watch crystal or glass, together with the dial, is an essential element of the image of the watch. Its fragility, scratch resistance and transparency are important features.

In addition, the sealing of the apparatuses, whether portable or not, including crystals or screens is fundamental not only for the proper functioning of said apparatuses but also for the image of the manufacturers for whom returns to after-sales services are very badly perceived.

Thus, a degradation of the screen or of a crystal is very damaging to the use or even the proper future functioning of the apparatus.

To cope with this two-fold problem, solutions aiming at making unbreakable or scratchproof crystals or screens have been developed.

Highly transparent polycarbonate timepiece faces are used, for example, to improve the decorative quality. In a case where an adhesive is used in a timepiece face created by gluing a plurality of plate-like substrates, air bubbles enter into an adherence layer, a bonding layer between the substrates, and significantly reduce the aesthetic appearance of the timepiece as a whole.

EP2508952 describes a timepiece face comprising a first substrate which comprises at least 50 weight % of a polycarbonate, a second substrate which comprises at least 50 weight % of a polycarbonate and a bonding layer bonding the first substrate and the second substrate. The bonding layer is configured from an adhesive composition obtained by irradiation of a UV-crosslinking acrylic resin material.

WO2014003495 describes a protective film for a screen, which can be glued in the correct position on an LCD screen of a mobile phone. The protective film structure for a mobile phone screen comprises the protective film, which has the same size as the LCD screen on the mobile phone and whose surface is coated with an adhesive agent, a lower release paper, which is glued on the protective film such that a side surface of the lower release paper comes into close contact with an inner surface of the protective film. The protective film structure further comprises an upper release paper, which is glued on the other outer surface of the protective film and the first and second fastening papers, which are located on one end portion or the other end portion of the upper release paper and are glued and come into close contact with the edge of one end or the other end of the mobile phone. This scratch protective film does not provide any protection for sealing in case of breakage of the main screen.

EP2754739 describes a closure glass pane component for an electronic device such as a telephone. The closure glass pane component comprises an aluminum oxide ceramic material having first and second main surfaces, the first and second main surfaces defining therebetween the closure glass pane component. A first portion of the closure glass pane component has a compressive residual stress induced therein by selective annealing of the first portion of the closure glass pane and a second portion of the closure glass pane component does not have a compressive residual stress induced therein. The first portion of the closure glass pane component, where a compressive residual stress is induced, has a higher compressive residual stress than the second portion of the closure glass pane component, where the compressive residual stress is not induced. The crystalline aluminum oxide material is a substantially monocrystalline aluminum oxide material, such as, for example, sapphire.

EP3121002A1 describes a protective cover for a user interface of an entertainment touch screen secured to the back of an aircraft seat. The cover comprises an external protective element comprising an outer surface comprising an ultra-thin glass layer, the ultra-thin glass comprising an internal surface and an opposite external surface defining a thickness. The thickness is comprised between 0.02 and 0.15 mm. An internal protective member constituted by a plastic is disposed on the inner surface of the ultra-thin glass. This system is a kind of security lamination avoiding that the aircraft passenger gets hurt in case of breakage of the screen.

EP2644670 describes an adhesive sheet including a first adhesive layer, a transparent acrylic resin layer and a second adhesive layer. According to one embodiment, this double-faced adhesive sheet can be used to glue against a touch screen.

WO2008/002772 describes an optical item comprising a rigid first optical substrate, a rigid second optical substrate and a self-supporting optical adhesive located between the first and the second rigid substrates in order to replace an anti-reflective layer likely to generate air bubbles. The self-supporting adhesive comprises a cross-linked polymer network based on silicone and a silicone fluid disposed in the polymer network.

The object of the present invention is to provide a mobile apparatus, handy, portable and transportable by a user, amongst a wristwatch, a smartphone or a tablet, and a fixed apparatus, in particular amongst interactive terminals, parking meters, vending machines, said mobile and fixed apparatuses including a crystal or a screen, and arranged to ensure sealing and an anti-scratch protection of an apparatus intended to display an information visible to a user through the crystal or the screen, the user being able to replace by himself and without tools components of the device.

In accordance with the invention, an apparatus includes a crystal or a screen, arranged to ensure sealing and an anti-scratch protection of said apparatus intended to display an information visible to a user through the crystal or the screen. The apparatus includes a first material layer made of an unbreakable transparent plastic polymer, typically at least one hundred or even two hundred times stronger than glass, the first material layer being arranged on the apparatus so that a first face is arranged on the information side and a second face on the user side, the first material layer being fastened to the apparatus in a tight manner. The apparatus includes a second material layer made of a transparent glass having an anti-scratch surface, in particular a sapphire glass, superimposed on the first layer and constituting the outer portion of the crystal or the screen of the apparatus, the second layer having an outer face arranged on the user side and an inner second face arranged on the information side. The second material layer may have the same shape and the same dimensions as the first material layer except for its thickness. Nonetheless, the second material layer may be smaller than the first material layer. The second material layer made of a transparent glass includes, carried by its inner face, a transparent repositionable glue film, this repositionable glue film ensuring the repositionable adherence of the second material layer on the first material layer, whereas the second material layer with its repositionable glue film can be removed in order to be replaced by another second material layer provided with a transparent repositionable glue film, without breaking the sealing of said apparatus ensured by the first material layer which remains fixed permanently on said apparatus.

In one embodiment, the apparatus includes sealing means including a protrusion, a gasket or a gluing arranged on the outer or inner periphery of the first material.

In one embodiment, the sealing of the apparatus may be ensured by an O-ring gasket which would be positioned between the apparatus and the first material layer or by ultrasonic bonding which would be carried out on the first material layer.

In one embodiment, the apparatus includes positioning means, said positioning means including a protrusion or a series of protrusions or a groove, arranged on the outer or inner periphery of the first material so that these positioning means surround all or part of the second material layer which covers the first material layer.

In a preferred embodiment, the first material layer, the second material layer and the repositionable glue film, once stacked, have a thickness comprised between 0.8 mm and 5 mm, typically 2 mm.

In one embodiment, the positioning means include a notch formed in the unbreakable first polymer layer. According to this embodiment, the notch constitutes an outer peripheral protrusion of the unbreakable first material layer.

For better visual comfort, the first material layer and/or the second material layer have an anti-reflective treatment to optical radiation in the visible wavelength range.

In a preferred embodiment, the first material layer is a polycarbonate with a thickness comprised between 0.2 mm and 2 mm or even 3 mm, typically 1 mm. Transparent polycarbonate is a virtually unbreakable material. Moreover, transparent polycarbonate has a high clarity and a good optical performance for applications where good visibility is important in particular for the watchmaking and watch crystals industry.

Preferably, the second material layer is a transparent sapphire glass with a thickness comprised between 0.2 mm and 1 mm or even 2 mm, typically 0.55 mm. This material has a particular consistency and is deemed scratchproof. It is also found in watch crystals for high quality watches and this material can have a rounded or square, rectangular, oval, triangular, lozenge shape, or any other shape.

In one embodiment, the first material layer and the second material layer are cambered in exact correspondence with each other.

Such a mobile device allowing combining the sealing aspect and the scratchproof aspect can be for example not only a wristwatch, a smartphone, a tablet or even similar portable apparatus including a screen such as a portable game console but also a fixed apparatus, in particular an interactive terminal, a parking meter or a vending machine such as for example an automated teller machine.

A suitably transparent repositionable glue is selected by adjusting its mechanical properties and so that it is compatible with the support on which it is coated on the one hand, and the support on which it is glued in a repositionable manner. Preferably, the repositionable glue is deposited at the end of manufacture of the transparent glass crystal, for example by spraying and homogeneously over the entire glass surface. Advantageously, the glue is selected from glues enabling an almost instantaneous catch at the surface of the glass crystal in order to be able to superimpose an interlayer thereon, for example a suitable sheet of paper. For example, the glue may have been covered after a drying time with a PTFE (polytetrafluoroethylene) film that the user takes off before gluing the sapphire crystal on the first material layer.

Alternatively, the glue applied to the inner surface of the second layer is in the form of double-faced adhesive tape with a polyester support and a high-performance surface adhesive which provides good adhesion to substrates at high and low surface energy. The thickness of the repositionable glue is comprised between 80 microns and 250 microns depending on the selected model. The double-faced tape is of course transparent. Moreover, the glue has a very good resistance to shearing and peeling. Preferably, the glue has an adherence strength comprised between 5 N/cm and 50 N/cm, typically 15 N/cm on the inner side of the second layer against the first layer.

According to another aspect, the device of the invention includes a transparent sapphire glass layer having an anti-scratch surface on a first face, an opposite second face carrying a repositionable glue film may be provided separately from the system. Thus, when the sapphire glass layer, which is scratch-proof but can break up, breaks up, a replacement of the sapphire glass layer allows reconstituting the mobile apparatus to «new» condition without ever having an impact on the sealing of the apparatus.

According to this other aspect of the invention, the thickness of the transparent glass layer, in particular sapphire, is comprised between 0.2 mm and 1 mm or even 2 mm, preferably 0.55 mm.

In one embodiment, a component according to the present invention includes a transparent glass layer, in particular sapphire, having an anti-scratch surface on a first face, an opposite second face carrying a repositionable glue film covered with a removable protective sheet.

Preferably, the thickness of the transparent glass layer is comprised between 0.2 mm and 1 mm or even 2 mm, typically 0.55 mm.

In one embodiment, the transparent glass layer is a tinted and/or smoked and/or colored and/or broken and/or screen-printed and/or metallized translucent transparent glass.

The invention applies in particular to wristwatches, smartphones, tablets, interactive terminals, game consoles, touch tables or automated teller machines.

For a practical aspect, in particular for mobile apparatuses, which are handy, portable and transportable by a user, a kit may include one or a plurality of components according to the present invention, the kit further including a means for cleaning the first material layer, in particular a wipe, and/or an extraction system, in particular a suction cup, for removing the second material to be replaced.

Alternatively, the kit includes a plurality of components different from each other.

This component is available to the user either when purchasing the apparatus with at least one second replacement material layer with selected shape and dimensions, covered with a repositionable glue film with a protective sheet on the sticky portion, or by purchasing from a spare collection available at a retail point.

The features of the invention will appear more clearly on reading the description of several embodiments given solely as non-limiting example, with reference to the schematic figures, in which.

Figure 1:
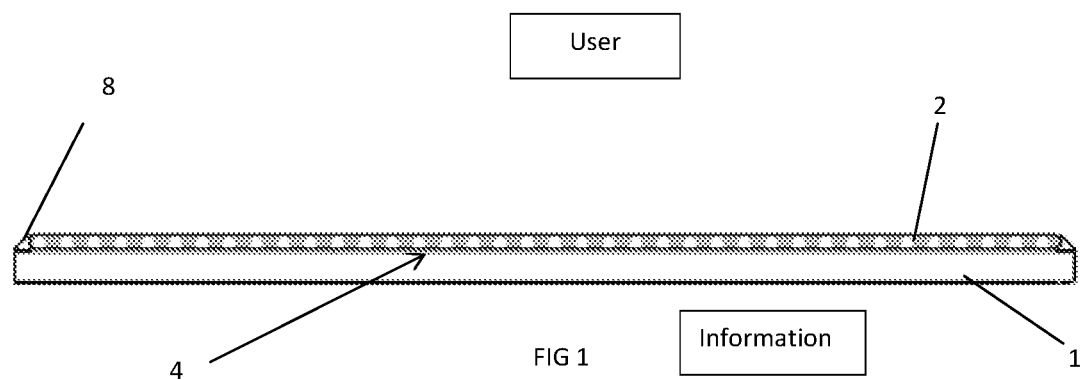
FIG. 1 represents a sectional view of a stack of materials layers according to the present invention.

As illustrated in FIG. 1, a mobile apparatus includes a first layer 1 of unbreakable transparent polycarbonate, a second layer 2 made of transparent sapphire glass having an anti-scratch treatment, superimposed on the first layer 1, the second layer 2 having an outer face arranged on the user side and a second inner face arranged on the information side. The apparatus includes positioning means for facilitating the positioning of the second material layer (2) on the first material layer (1), in the form of a notch including a protrusion 8 arranged on the outer periphery of the first layer 1 of polycarbonate so that these positioning means surround the second layer 2 of sapphire glass which covers the first layer 1 of polycarbonate. A repositionable glue film 4 is deposited over the inner face of the transparent sapphire glass layer 2 so that the sapphire glass layer 2 with the repositionable glue 4 could be removed without breaking the sealing of said apparatus and replacing it with a new sapphire glass layer 2 with repositionable glue 4, this new layer being available to the user.

An example of a transparent repositionable glue is the glue referenced 9088FL of the company 3M. In general, the repositionable glue should have a thickness of a few tens to a few hundred microns, for example from 100 microns to 200 microns. The repositionable glue film 4 is coated over the second layer 2 because it is the layer that is intended to be removed where needed, and this allows in particular avoiding having to clean the first layer 1, which remains permanently on the apparatus, before each gluing of the second layer on the first layer. Unlike the invention, by putting the glue on the outer surface of the first layer 1, the glue layer would be subjected to dust and after a few uses, the second layer 2 would not be sufficiently well fastened on the first layer 1.

Figure 2:
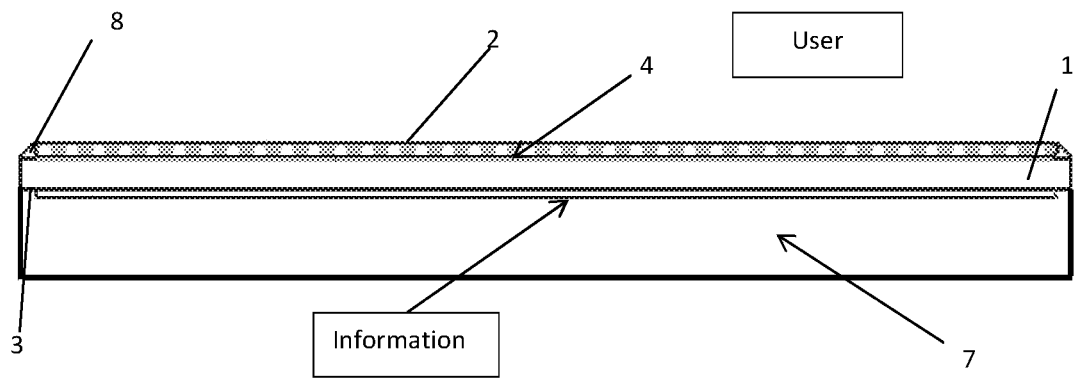
FIG. 2 represents a sectional view of an apparatus including a screen.

As illustrated in FIG. 2, the mobile device of the present invention is arranged to be incorporated in an apparatus 7 without denaturing the object. The device according to the invention takes the place of a conventional screen or crystal. The apparatus 7 comprises sealing means 3 for example in the form of a welding of the peripheral end of the first layer 1 on the outer periphery of the apparatus 7. Positioning means 8 surround and guide the second material layer 2 which covers the first material layer 1. A transparent repositionable glue film 4 is deposited over the inner face of the second material layer 2 made of a transparent glass, so that the second material layer with the repositionable glue could be removed without breaking the sealing of said apparatus 7 and replaced by a new sapphire glass layer 2 with a repositionable glue 4 available to the user.

Figure 3:
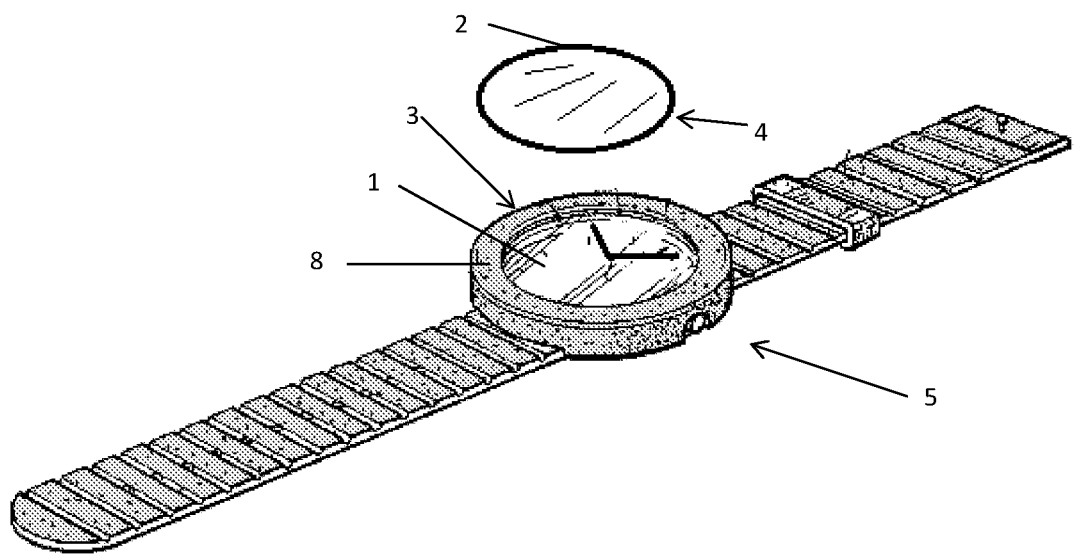
FIG. 3 represents a perspective view of a wristwatch in which a crystal including a repositionable glue is disposed to be arranged on a crystal of the watch.

The example illustrated in FIG. 3 is a wristwatch 5. The device of the present invention allows ensuring sealing and an anti-scratch protection of the wristwatch 5 intended to display, in particular, the time through the crystal. In this example, the device of the present invention includes a first material layer 1 made of an unbreakable transparent polycarbonate. The polycarbonate layer 1 is fastened on the wristwatch 5 in a tight manner by sealing means 3, in particular an O-ring gasket, so that a first face is arranged on the dial side of the wristwatch 5 and a second face on the user side. Polycarbonate is a material that is widely used in the watchmaking industry, in particular for its robustness, despite its sensitivity to scratches. A second transparent sapphire glass layer 2 having an anti-scratch surface is ready to be arranged on the polycarbonate layer 1 mounted on the wristwatch 5. The transparent sapphire glass layer 2 carries a repositionable glue film 4 applied on the inner face of said transparent sapphire glass layer 2. Thus, the sapphire glass layer 2 with its repositionable glue film 4 can be superimposed on the first polycarbonate layer 1 fastened on the wristwatch 5 and where needed, for example in case of breakage of the sapphire glass layer 2, said sapphire glass layer 2 with its glue film 4 can be removed without breaking the sealing of the wristwatch 5. A watch bezel 8 offers a means for positioning the sapphire crystal 2, the watch bezel being arranged on the outer periphery of the polycarbonate 1 so that sealing means 3 surround the polycarbonate layer 1 and are never broken in case of change of the sapphire crystal 2.

In a variant which is not illustrated, the sapphire glass is contained in a crystal notch, a housing dug either in the bezel of the case, or directly in its frame.

The stack of polycarbonate, sapphire crystal layers and the repositionable glue represent, for example, a 1.6 mm thickness. The polycarbonate has a 1 mm thickness and the sapphire glass, a 0.55 mm thickness.

In the world of smartphones, the screen is by far the element that breaks most frequently even if it is a reinforced glass. Sapphire is more robust and more scratch resistant than glass.

Figure 4:
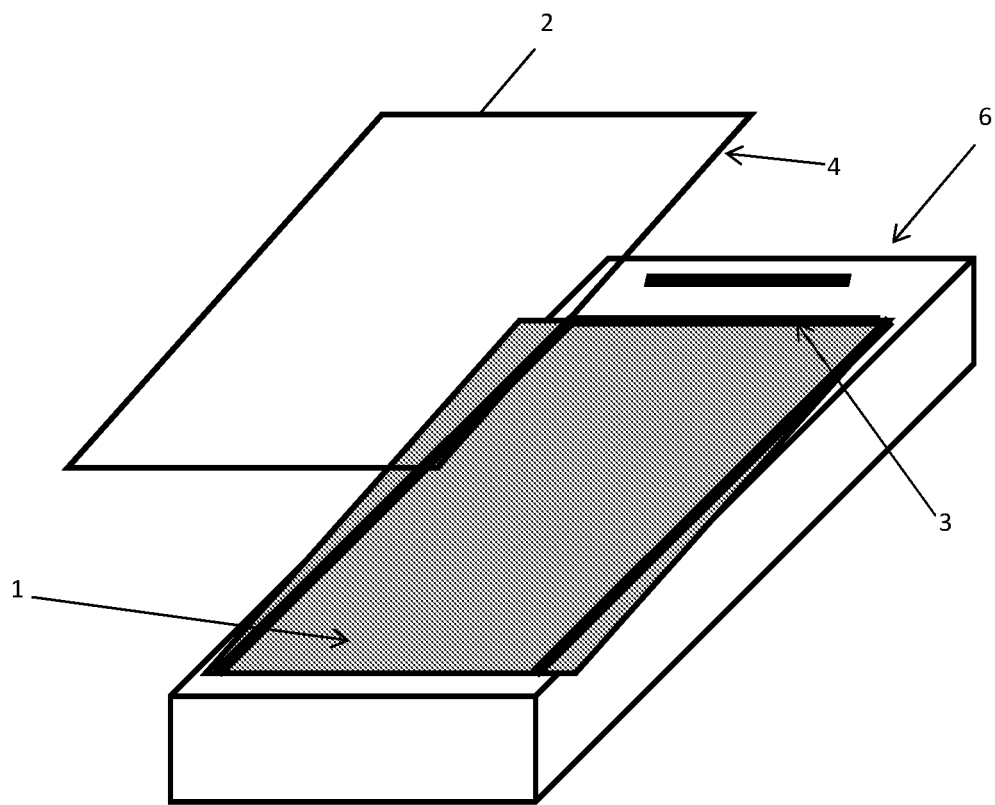
FIG. 4 represents a perspective view of a smartphone according to the present invention.

As illustrated in FIG. 4, a smartphone 6 includes a touch screen. This touch screen is composed of a first material layer 1 made of an unbreakable transparent plastic polymer, the first material layer 1 being fastened on said smartphone 6 in a tight manner and so that a first face is arranged on the information side and a second face on the user side. A second material layer 2 made of transparent sapphire glass having an anti-scratch surface is ready to be superimposed on the first layer 1 thanks to a transparent repositionable glue film 4 carried by the inner face of the transparent sapphire glass layer 2.

In this example, the repositionable glue is compatible with the support on which it is coated, on the one hand, herein a sapphire glass, and the support on which it is glued in a repositionable manner, herein a polycarbonate.

According to FIG. 4, a notch 3 in the box of the smartphone 6 constitutes an outer peripheral protrusion of the unbreakable first material layer.

In this example, the first material layer 1 and the second material layer 2 have an anti-reflective treatment to optical radiation in the visible wavelength range. The second material layer 2 is a substantially monocrystalline aluminum oxide, more specifically a synthetic sapphire having an anti-scratch surface on a first face, an opposite second face including a repositionable glue film 4.

According to the present invention, the creation of a sandwich including a polycarbonate layer, a synthetic sapphire layer with a repositionable invisible binder carried by the sapphire layer allows never impacting the sealing of the apparatus in case of breakage of the sapphire glass layer. Thus, the broken or damaged sapphire glass layer can be removed with its repositionable binder film, the apparatus remaining functional and sealed until a new repositionable sapphire glass layer with a repositionable binder film is set in place. Thus, we obtain a scratchproof surface condition, and in case of an impact of the crystal, the polycarbonate layer does not break up and therefore protects the inside of the device against dust and moisture while waiting for a replacement for the broken sapphire crystal layer.

Figure 5A:
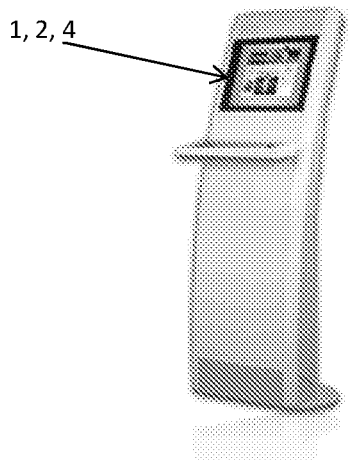
FIGS. 5A to 5E represent products according to the present invention.
Figure 5B:
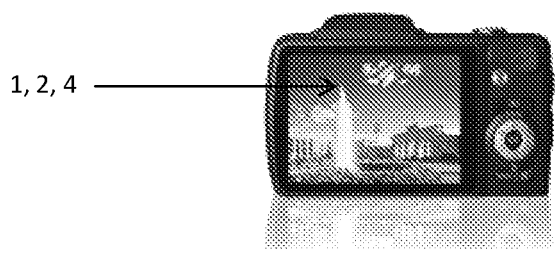
Figure 5C:
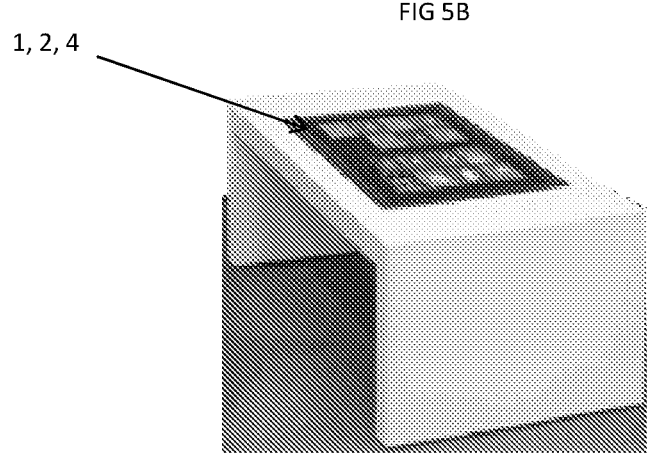
Figure 5D:
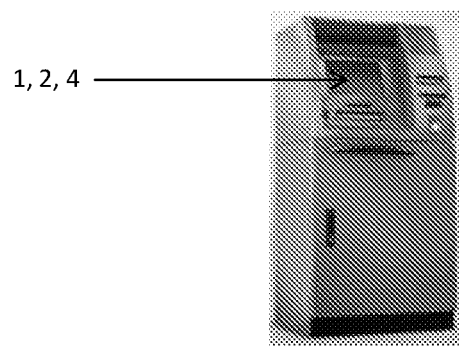
Figure 5E:
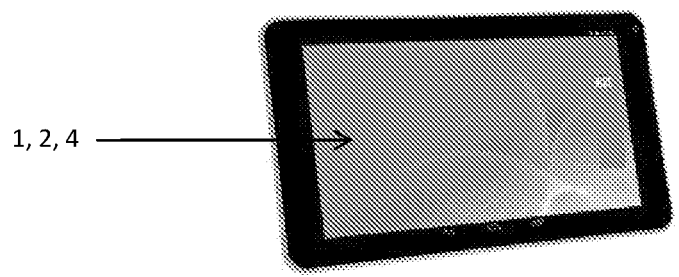

As illustrated in FIGS. 5A to 5E, the «sandwich» system according to the invention described hereinabove can be used in many applications. For example, in FIG. 5A, the system is integrated into an interactive terminal and in FIG. 5B the system is integrated into a camera. In FIG. 5C, the system is integrated on a touch table and in FIG. 5D the system is integrated on an automated teller machine. Finally, in FIG. 5E, the system is integrated on a tablet. In each of these apparatuses, a first layer 1 is permanently fastened on said apparatus while a second layer 2 with its repositionable glue film 4 is placed on top.

As regards mobile apparatuses which are handy, portable and transportable by a user such as wristwatches, smartphones, tablets, cameras or game consoles, the broken sapphire glass layer can be removed by the user himself.

Figure 6:
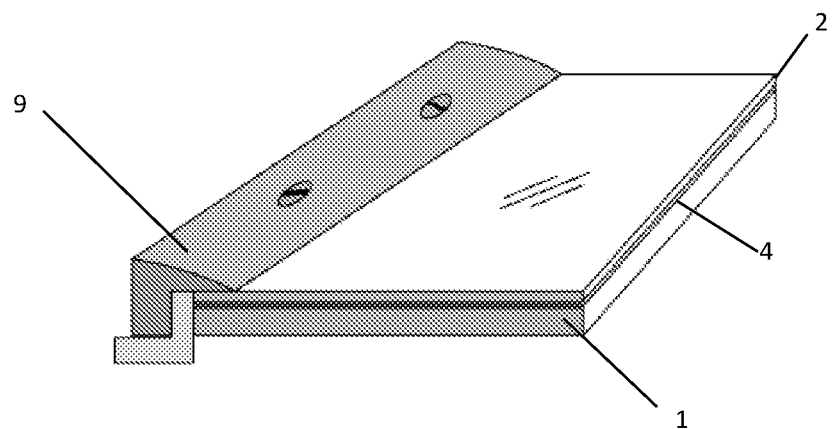
FIG. 6 represents a partial view of an apparatus according to the present invention including a security device in the form of a cap.

As regards shared-use devices, in particular parking meters, automated teller machines or interactive terminals, a security device may be integrated to prevent the sapphire glass layer, whether broken or not, from being removed by an unauthorized person. This security device consists for example of a cap 9 (FIG. 6) surrounding all or part of the peripheral surface of the sapphire glass. Thus, the authorized person should first have the appropriate equipment, such as a key, or a custom screw to remove the cap 9 in order to intervene on the sapphire glass layer 2.

The invention claimed is:

1. An apparatus including a crystal or a screen wherein the crystal or the screen is arranged to ensure sealing and an anti-scratch protection of said apparatus which is configured to display an information visible to a user through the crystal or the screen, said apparatus including:
a first material layer (1) made of an unbreakable transparent plastic polymer, the first material layer (1) being arranged on said apparatus so that a first face is arranged on the information side and a second face on the user side, the first material layer being fastened on the apparatus in a tight manner,
a second material layer (2) made of a transparent glass having an anti-scratch surface superimposed on the first layer (1) and constituting the outer portion of the crystal or the screen of the apparatus, the second layer having an outer face arranged on the user side and an inner face arranged on the information side,
the second material layer (2) made of a transparent glass including, carried by its inner face, a transparent repositionable glue film (4), this repositionable glue film (4) ensuring the repositionable adherence of the second material layer (2) on the first material layer (1), whereas the second material layer (2) with its repositionable glue film (4) can be removed so as to be able to be replaced by another second material layer (2) provided with a transparent repositionable glue film (4), without breaking the sealing of said apparatus ensured by the first material layer (1) which remains permanently fastened on said apparatus
said apparatus further including positioning means (8) for facilitating the positioning of the second material layer (2) on the first material layer (1), said positioning means (8) including one or a series of protrusions or a groove, arranged on the outer or inner periphery of the first material (1) so that these positioning means (8) surround the second material layer (2) which covers the first material layer (1).

2. The apparatus according to claim 1, including sealing means (3) including a protrusion, a gasket or a gluing arranged on the outer or inner periphery of the first material (1).

3. The apparatus according to claim 1, wherein the first material layer (1), the second material layer (2) and the repositionable glue film (4), once stacked, have a thickness comprised between 0.8 mm and 5 mm.

4. The apparatus according to claim 1, wherein the positioning means (8) includes a groove in the form of a notch formed in the first material layer (1).

5. The apparatus according to claim 1, wherein the first material layer (1) and/or the second material layer (2) have an anti-reflective treatment to optical radiation in the visible wavelength range.

6. The apparatus according to claim 1, wherein the first material layer (1) is a polycarbonate or an acrylic material with a thickness comprised between 0.2 mm and 2 mm.

7. The apparatus according to claim 1, wherein the second material layer (2) is a sapphire glass with a thickness comprised between 0.2 mm and 1 mm.

8. The apparatus according to claim 1, wherein the first material layer (1) and the second material layer (2) are cambered in exact correspondence with each other.

9. The apparatus according to claim 8, including a screen.

10. An apparatus according to claim 1 which is a wristwatch.

11. An apparatus according to claim 1 which is a smartphone.

12. An apparatus according to claim 1 which is a tablet, an interactive terminal, a camera, a game console, an automated teller machine or a touch table.

13. A set comprising an apparatus according to claim 1 and at least one replaceable component, the replaceable component including a layer (2) made of a transparent glass having an anti-scratch surface on a first face, an opposite second face carrying a repositionable glue film (4) covered with a protective sheet.

14. A set according to claim 13, wherein the transparent glass layer (2) of the replaceable component is made of sapphire.

15. A set according to claim 13, wherein the thickness of the transparent glass layer (2) of the replaceable component, is comprised between 0.2 mm and 1 mm.

16. A set according to claim 13, wherein the transparent glass layer (2) of the replaceable component is a tinted and/or smoked and/or colored and/or broken and/or screen-printed and/or metallized translucent transparent glass.

17. A set according to claim 13, including a kit of a plurality of said replaceable components, the kit further comprising a wipe for cleaning the first material layer (1), and/or a suction cup, for removing the second material (2) to be replaced.

18. A set according to claim 13, including a plurality of said replaceable components of which a plurality of the replaceable components are different from each other.

* * * * *